United States Patent
Blake, III

Patent Number: 5,857,799
Date of Patent: Jan. 12, 1999

[54] BASE CHANNEL CONNECTOR CLIP

[76] Inventor: Thomas E. Blake, III, 2540 Chalet, Rochester Hills, Mich. 48309

[21] Appl. No.: 339,314

[22] Filed: Nov. 14, 1994

Related U.S. Application Data

[63] Continuation of Ser. No. 982,162, Nov. 24, 1992, abandoned.

[51] Int. Cl.⁶ .................................................... F16B 7/00
[52] U.S. Cl. ......................... 403/292; 52/726.1; 174/95
[58] Field of Search ............................... 174/48, 49, 68.1, 174/68.3, 66, 67, 95, 97, 101; 403/2, 286, 292, 294, 387, 405.1, 363, 331, 397, 406.1, 407.1, 329; 52/100, 726.1

[56] References Cited

U.S. PATENT DOCUMENTS

| | | | |
|---|---|---|---|
| 2,717,715 | 9/1955 | Whelan | 220/3.94 |
| 3,051,772 | 8/1962 | Davis | 174/61 |
| 3,557,514 | 1/1971 | Fahrni | 403/294 X |
| 3,665,646 | 5/1972 | Niemanns | 52/716.5 X |
| 3,844,440 | 10/1974 | Hadfield et al. | 220/3.94 X |
| 3,927,698 | 12/1975 | Johannsen | 174/97 X |
| 4,136,257 | 1/1979 | Taylor | 174/68.3 |
| 4,627,469 | 12/1986 | Buard | 174/101 X |
| 4,990,722 | 2/1991 | Benito Navazo | 174/97 |
| 5,134,250 | 7/1992 | Caveney et al. | 174/101 |
| 5,206,972 | 5/1993 | Nudelmont et al. | 174/49 X |

FOREIGN PATENT DOCUMENTS

| | | | |
|---|---|---|---|
| 3628672 | 2/1988 | Germany | 174/48 |
| 4120938 | 1/1992 | Germany | 174/48 |
| 0445595 | 2/1968 | Switzerland | 174/101 |
| 1021871 | 3/1966 | United Kingdom | 174/101 |
| 1214938 | 12/1970 | United Kingdom | 174/101 |
| 8100793 | 3/1981 | WIPO | 174/97 |
| 8807282 | 9/1988 | WIPO . | |

*Primary Examiner*—Hyung S. Sough
*Attorney, Agent, or Firm*—Mark D. Hilliard; Robert A. McCann; Michael J. Turgeon

[57] ABSTRACT

A base channel connector clip having a planar resilient body portion with a frangible support leg extending transverse to the body portion that can be easily removed to connect a plurality of duct sizes having different width interior clip positioning channels.

1 Claim, 7 Drawing Sheets

BASE CHANNEL CONNECTOR CLIP

This application is a continuation of application Ser. No. 07/982,162, dated Nov. 24, 1992, now abandoned.

TECHNICAL FIELD

The present invention relates to a plurality of plastic components that are designed for assembly to construct an electrical wire trunking or duct system for positioning, enclosing and protecting electrical power and/or data wires.

BACKGROUND ART

Many different types and configurations of trunking systems have been proposed. For example, see U.S. Pat. No. 4,602,124 to Santucci and U.S. Pat. No. 5,089,667 to Goussin et al. Trunking systems typically include base channels, covers, wire retainers, divider walls, and end caps in various combinations and configurations. One known end cap includes a plastic cap which is secured to a base channel by a metal clamp, constructed of a plurality of metal parts, which is tightened against mounting rails of the base channel by a screw. This end cap requires the manufacture of a plurality of metal parts and assembly of these parts to the plastic end cap which increases the cost of manufacture of the end cap.

A desirable trunking system design includes economically manufactured components that can be easily assembled in one of a number of different desired configurations to position, enclose and protect wires therein. Although many different trunking system designs have been proposed, none yet have provided the best combination of features and the best manufacturing economy and there is still need for improvement in the art.

SUMMARY OF THE INVENTION

It is the object of the present invention to provide a trunking system comprising economically manufactured components that can be assembled to position, enclose and protect wires positioned therein.

In general, a trunking system includes a base channel including a bottom wall, opposing side walls disposed perpendicular to the bottom wall and projecting upwardly therefrom and top walls disposed perpendicular to each respective side wall and projecting inwardly therefrom, an elongate wire retainer having first retainer latching means for securing the retainer to the base channel, a cover for enclosing the base channel having first cover latching means for securing the cover to the base channel, second retainer latching means disposed on each of the top walls of the base channel and projecting inwardly towards the opposite second retainer latching means both of which include complementary structural features that securely latch with the first retainer latching means of the wire retainer and second cover latching means disposed on each of the top walls of the base channel and projecting outwardly and upwardly of the base channel, both second cover latching means including complementary structural features that securely latch with the first cover latching means of the cover.

Also included in the trunking system are a divider wall, an end cap and a resilient base channel connector clip. The divider wall includes a vertical wall, a horizontal wall projecting from a lower portion of the vertical wall, opposing spaced apart resilient latches disposed on the horizontal wall to latch to a mounting rail of a base channel and extension rib means formed on the horizontal wall for spacing the horizontal wall from the mounting rail such that the effective resilient length of the resilient latches is increased. The divider wall also may include a vertical wall, a horizontal wall projecting from a lower portion of the vertical wall and a means for latching the divider wall to a mounting rail of a base channel having a stabilizing wall projecting downwardly from the divider wall and terminating adjacent the bottom wall of the base channel such that over rotation of the divider wall is resisted when the stabilizing wall engages the bottom wall.

The end cap is integrally molded having upper and lower, spaced apart, cantilever attachment latches disposed to engage a mounting rail of a base channel when the end cap is secured to the base channel, wherein the upper and lower cantilever attachment latches include fastener means for compressing the latches together into latching engagement with the mounting rail.

The resilient base channel connector clip for securing together adjacent abutting sections of a base channel is disposed in an interior clip positioning channel formed in the base channel and includes a planar resilient body portion having a frangible support leg that extends transverse to the body portion and can be easily removed to allow use of the connector clip with a plurality of duct sizes having different width interior clip positioning channels.

DESCRIPTION OF THE PREFERRED EMBODIMENT

Figure 7:
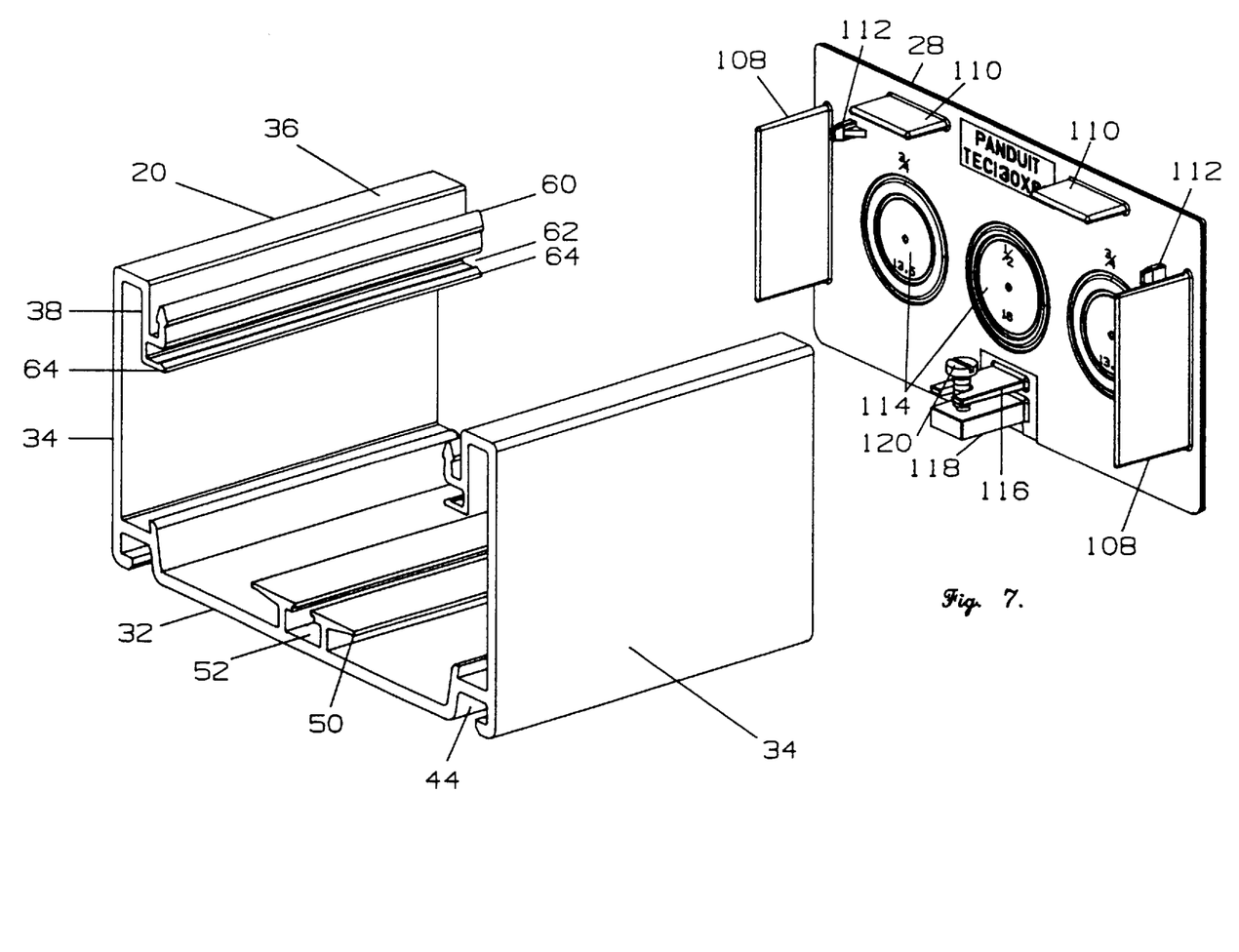
FIG. 7 is a perspective view of the base channel of the trunking system of FIG. 1 disposed adjacent an interlocking end cap fitting.
Figures 8, 9:
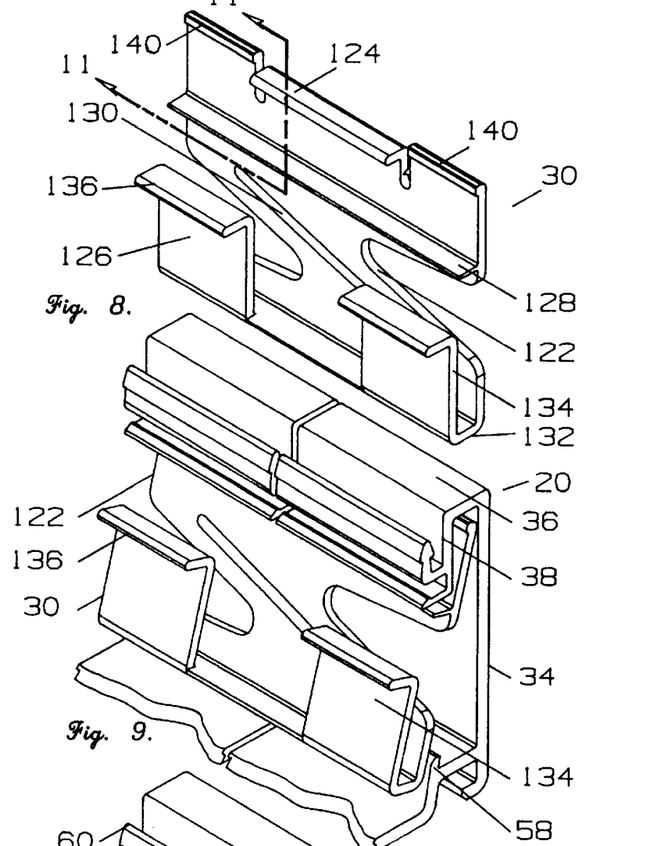
FIG. 8 is a perspective view of a connector clip for joining abutting sections of the channel base of FIG. 1.
FIG. 9 is a perspective view of the connector clip of FIG. 8 as the clip is inserted into a lateral clip positioning channels of abutting sections of the partially broken away base channel of FIG. 1.
Figure 10:
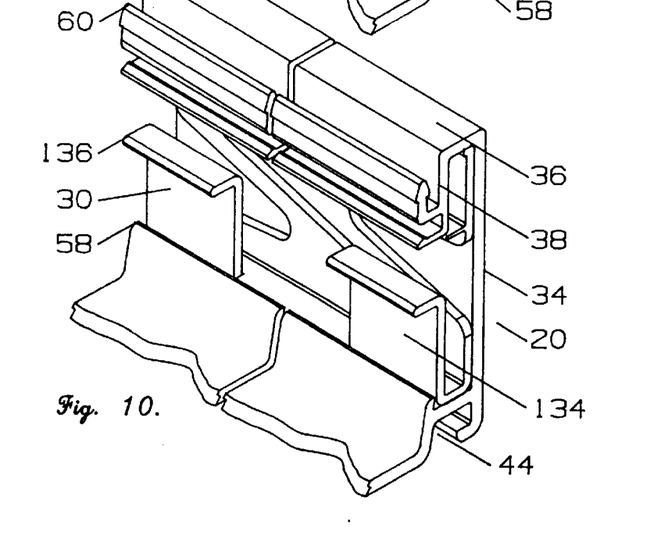
FIG. 10 is a perspective view of the connector clip and channel bag of FIG. 9 with the clip fully inserted and joining adjacent channel base sections.

A trunking system includes a base channel 20, a wire retainer 22, a cover 24, a divider wall 26, an end cap fitting 28 (see FIG. 7) and a connector clip 30 (see FIGS. 8–10). All parts, except retainer 22 which is molded of ABS thermoplastic, are preferably extruded or molded of a suitable thermoplastic such as polyvinyl chloride.

Base channel 20, cover 24 and divider wall 26 in preferred construction are extruded and cut into a length suitable for shipping, which is typically 2 meter lengths. Base channel 20 includes a bottom wall 32, side walls 34, top walls 36 and inner side walls 38. The features of base channel 20 are symmetrical with respect to a medial longitudinal axis of base channel 20 with the left half of base channel 20 being the mirror image of the right side.

Upwardly directed L-shaped curves 40 in each bottom wall 32 disposed at the outer ends of wall 32 in conjunction with inwardly directed L-shaped extensions 42 of each side wall 34 define parallel mounting channels 44 that accept edges of mounting brackets (not shown) to snap mount channel base 20 to a mounting surface.

Figure 2:
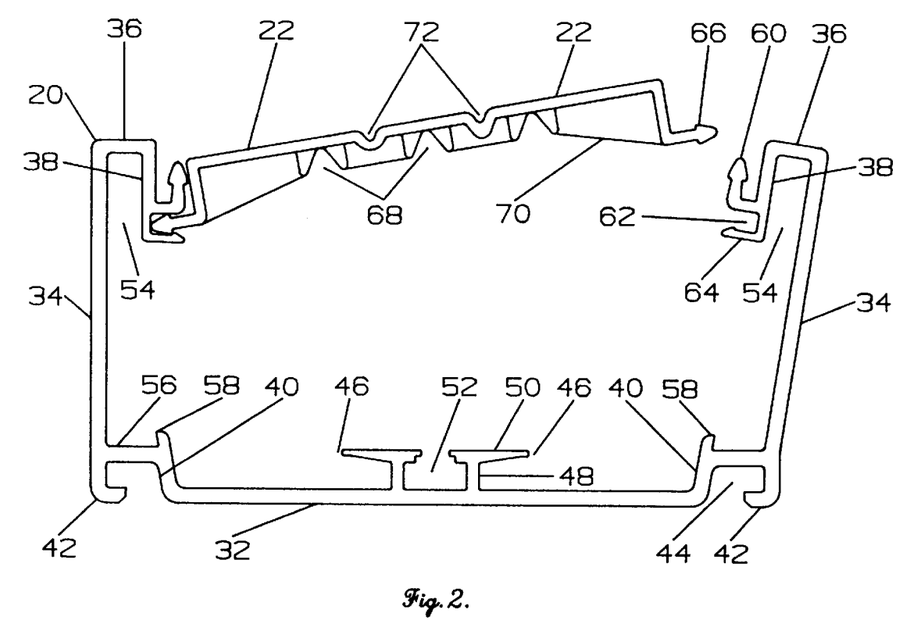
FIG. 2 is a front view of the trunking system of FIG. 1 showing a wire retainer being inserted into position in a base channel.
Figure 3:
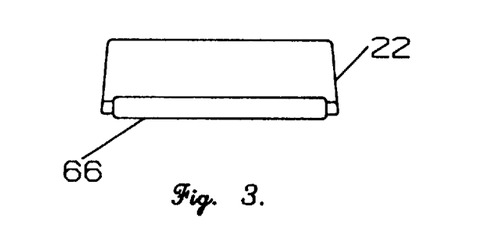
FIG. 3 is a side view of the wire retainer of FIG. 1.
Figure 4:
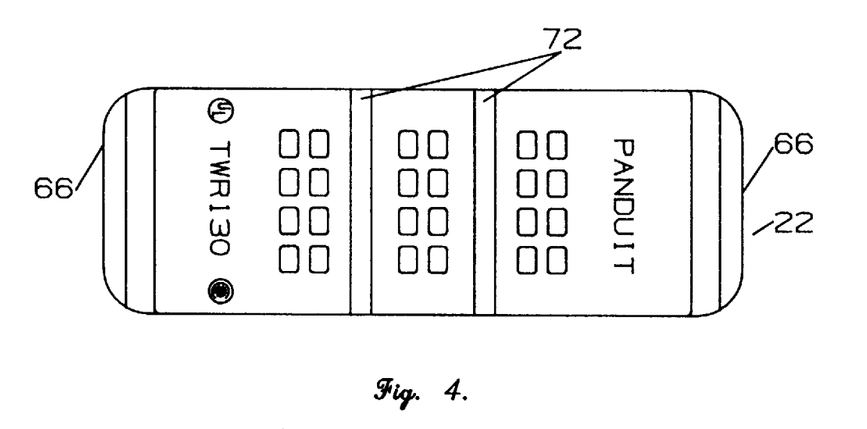
FIG. 4 is a top view of the wire retainer of FIG. 1.
Figure 5:
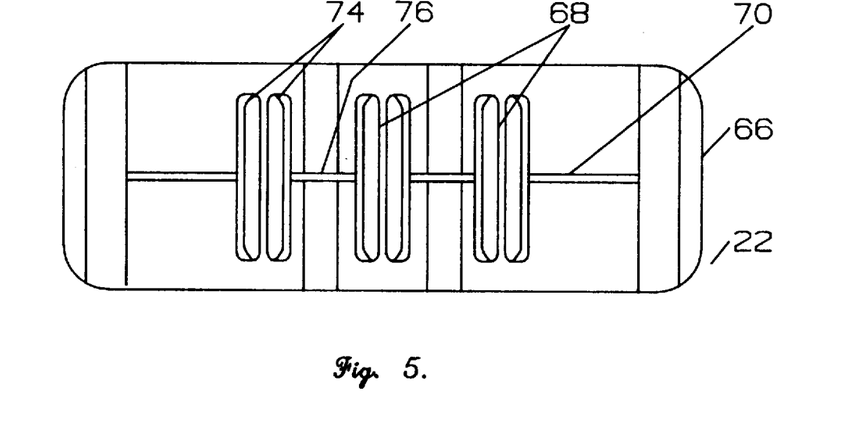
FIG. 5 is a bottom view of the wire retainer of FIG. 1.

As seen in FIG. 2, mounting rails 46 are formed on the inner surface of bottom wall 32. Mounting rails 46 include a support wall 48 formed perpendicular to bottom wall 32 and a planar mounting ridge 50 that is spaced from bottom wall 32 by support wall 48. Adjacent mounting rails 46 define a rail channel 52 there between. Adjacent rails 46 form a standard DIN rail geometry that allows standard components, such as, junction boxes and circuit breakers to be mounted to rails 46.

Upper and lower clip positioning channels 54 and 56 are respectively defined by a side wall 34, top wall 36, and inner side wall 38 and defined by L-shaped curve 40, side wall 34 and ridge 58. Clip positioning channels 54 and 56 are disposed along the outer lateral extent of base channel 20 to contain and position resilient connector clip 30.

An L-shaped cover latch 60 is formed projecting inwardly and then upwardly from inner side wall 38 with the distal edge of latch 60 projecting upwardly out of base channel 20. An arrow shaped latch ridge is formed at the distal edge of cover latch 60.

A wire retainer accepting socket 62 is defined by a L-shaped socket ridge 64 projecting downward and inwardly from an inner side wall 38 (see FIG. 2). Each socket 62 opens inwardly in alignment with and directed towards an opposing socket 62 on the opposite side of base channel 20. Sockets 62 accept and lock arrow shaped distal edges 66 of wire retainer 22.

Wire retainer 22 is best seen in FIGS. 1 and 3–5. Retainer includes arrow shaped distal edges 66, divider wall positioning V-shaped grooves 68, reinforcing gussets 70, and cover positioning grooves 72. V-shaped grooves are formed by a pair of wedges 74 formed on the bottom side of retainer 22 with reinforcing ridges 76 extending between wedges 74 and a plurality of indentations formed on the upper side of retainer 22 directly above wedges 74 to enhance the molding of retainer 22. Arrow shaped distal edges 66 of wire retainer 22 can be inserted into sockets 62 of base channel 20 by inserting a first edge 66 into a first socket 62, as seen in FIG. 2, while bending the opposite side wall 34 outwardly and inserting the retainer within the opposite socket 62 or, when a divider wall 26 is not assembled to base channel 20, by positioning wire retainer 22 transverse to the length of base channel 20, with edges 66 aligned with respective sockets 62 and rotating retainer 22 until edges 66 are positioned in sockets 62. Retainers 22 are securely held within sockets 62 so that wires contained in base channel 20, when bottom wall 32 of base channel 20 is fastened to a ceiling, are securely held within base channel 20 by retainers 22.

Figure 1:
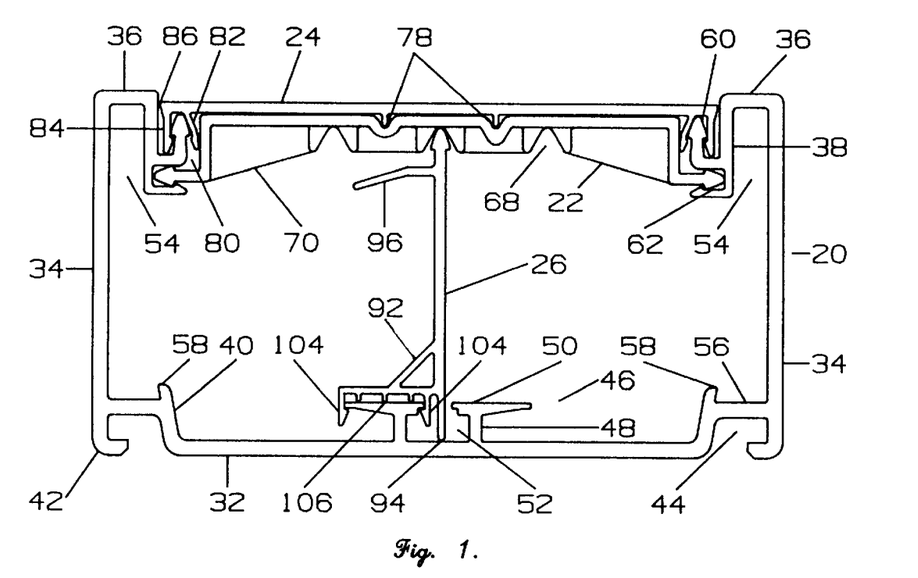
FIG. 1 is a front view of the trunking system embodying the concept of the present invention showing a wire retainer, cover and a divider wall assembled to a channel base.
Figure 6:
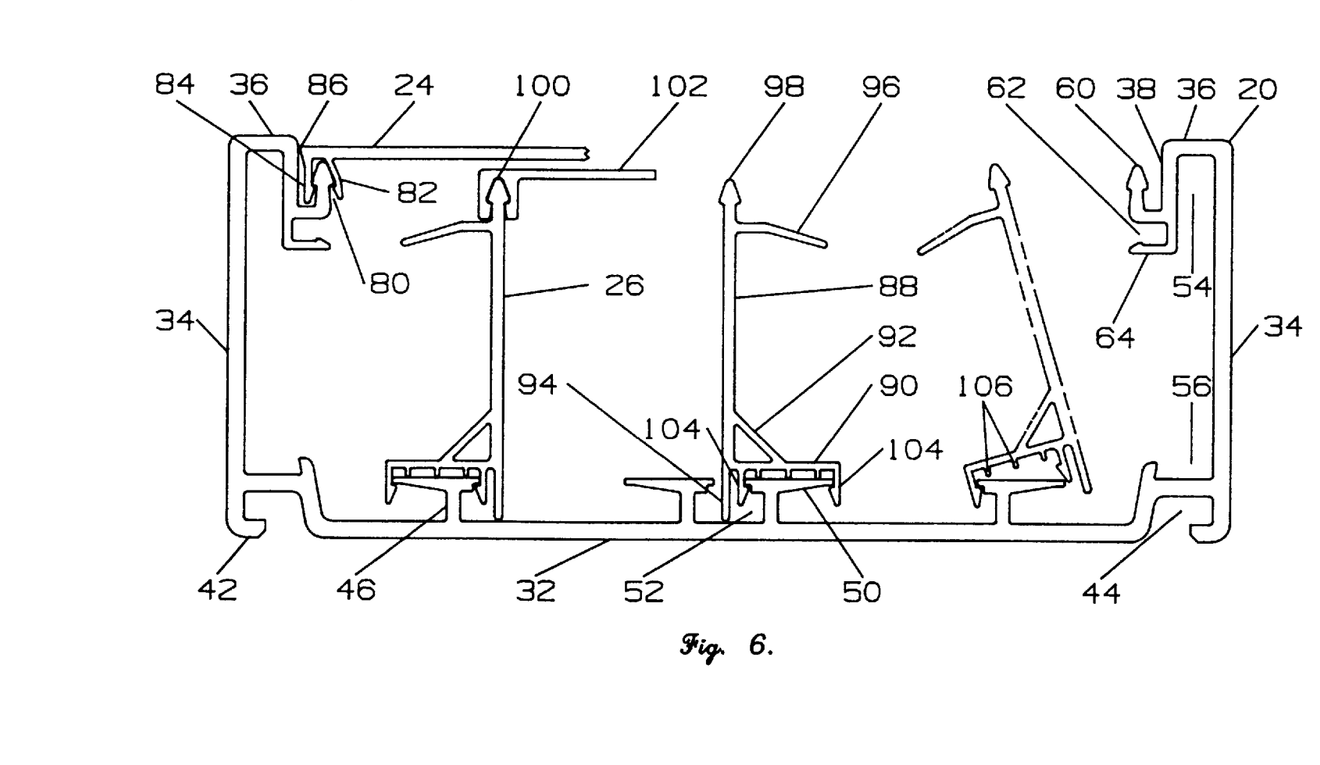
FIG. 6 is an front view of a larger width trunking system similar to the trunking system of FIG. 1 with a cover partially broken away, showing the method of assembling the divider wall to the channel base.

As seen in FIGS. 1 and 6, cover 24 includes a planar upper surface, a pair of reinforcing ridges 78 formed on the bottom surface of cover 24 and lateral sockets 80 formed along opposite lateral peripheral edges of cover 24 by downwardly projecting resilient inner and outer socket walls 82 and 84. Lateral cover edges 86 extend outward beyond outer socket wall 84. The width of cover 24 is chosen to seal lateral cover edges 86 against inner side walls 38 of base channel 20 to seal base channel 20 without interfering with the resilient action of outer socket wall 84. Reinforcing ridges 78 fit within cover positioning grooves 72 of wire retainer 22. Each pair of inner and outer socket walls 82 and 84 resiliently engage each respective cover latch 60 to secure cover 24 to channel base 20.

As best seen in FIG. 6, integrally formed, extruded divider wall 26 includes a vertical wall 88, a horizontal bottom wall 90, a reinforcing gusset wall 92, a stabilizing wall 94 and a retention wall 96. An arrow shaped latching ridge 98 is formed on the upper, distal edge of vertical wall 88 and is shaped to engage a mating socket 100 in a wire retainer 102 or grooves 68 in retainer 22 (see FIG. 1). Projecting downwardly from the bottom surface of bottom wall 90 are opposed, spaced apart, side latches 104 that are disposed to resiliently engage a mounting ridge 50 to secure divider wall 26 to base channel 20. A plurality of extension ribs 106 formed on the bottom surface of bottom wall 90, between latches 104 extend downwardly to engage mounting ridge 50 and space bottom wall 90 which carries latches 104 from mounting ridge 50. Spacing bottom wall 90 from mounting ridge 50 effectively lengthens latches 104, increasing their resilience to optimize the latching action of latches 104 to provide a secure and removable latching action that is not as sensitive to tolerance variations in latches 104 and ridges 50. Stabilizing wall 94 projects from and is parallel to vertical wall 88, extending downward adjacent to or into engagement with bottom wall 32 of base channel 20. Stabilizing wall 94 prevents over-rotation of divider wall 26 and thus provides greater stability to divider wall 26.

Referring now to FIG. 7, end cap fitting 28 includes lateral support walls 108 disposed to be received between side walls 34 of base channel 20, top support walls 110 disposed to support cover 24, alignment barbs 112 disposed to enter socket 62 to accurately position end cap fitting 28 relative to base channel 20, a plurality of drill guides 114 that facilitate removal of a portion of end cap 28 to allow access to base channel 20, upper and lower integrally formed cantilever attachment latches 116 and 118, and screw 120. Upper latch is formed with a relatively thin flexible profile with an open screw accepting slot formed in its distal end. Lower latch 118, which includes a screw accepting aperture, is received within rail channel 52, with mounting ridges 50 disposed between upper and lower latches 116 and 118 such that tightening screw 120 into lower latch 118 compresses upper and lower latches 116 and 118 against mounting ridges 50 positioned there between to securely attach end cap fitting 28 to channel base 20.

As best seen in FIGS. 8–15, connector clip 30 is received within upper and lower clip positioning channels 54 and 56 (see FIG. 2) for connecting adjacent lengths of base channel 20. Connector clip 30 includes a planar Z-shaped integral spring body member 122 having disposed along an upper distal edge a medial frangible support leg 124 and disposed along a lower distal edge lower support legs 126. A support rib 128 is formed on the upper inner planar surface of connector clip 30 parallel to the length of base channel 20 when connector 30 clip is installed. Rib 128 provides support and strengthens connector clip 30. A diagonal slot 130 is formed in the diagonal portion of Z-shaped body member 122 to enhance the resilience of the same.

Each lower support leg 126 includes a bottom portion 132 which is formed perpendicular to and extending inwardly from body member 122, an upwardly extending lever portion 134 formed parallel to body member 122, and a finger tab 136 extending inwardly from the distal edge of lever portion 134 that is disposed to allow easy manipulation for removal of connector clip 30.

Figure 11:
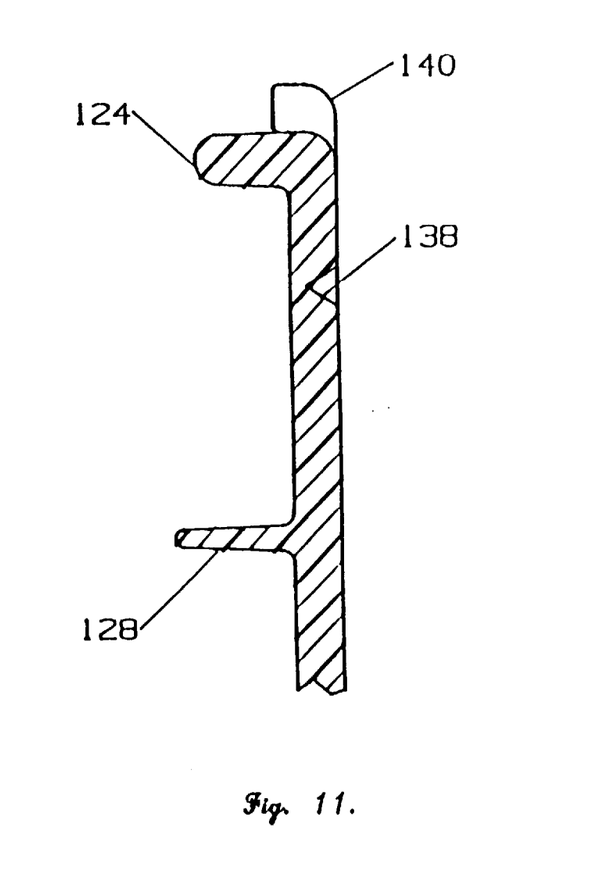
FIG. 11 is a sectional view taken along line 11—11 of FIG. 8 showing a score line that allows the selective removal of a middle support leg.
Figure 12:
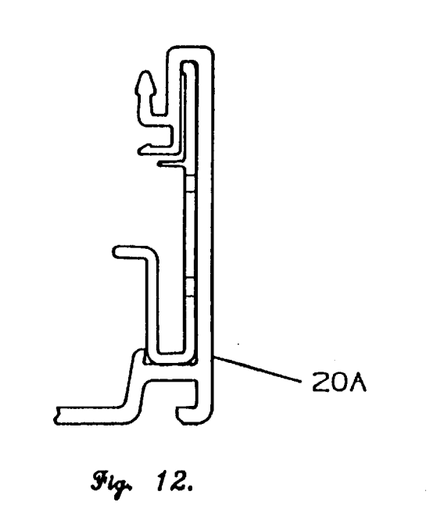
FIG. 12 is a front view, partially broken away, of a smaller size of channel base of FIGS. 1 and 10 with the middle support leg removed to allow positioning of the connector clip within the narrower lateral clip positioning channel.
Figure 13:
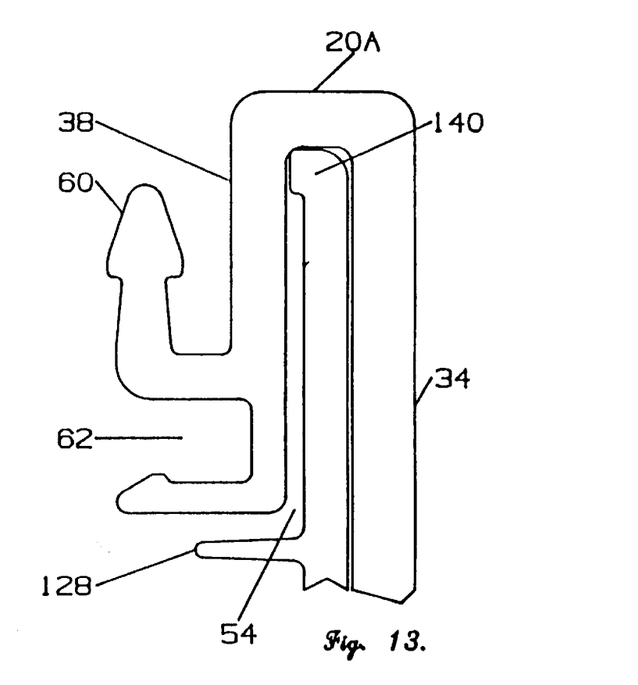
FIG. 13 is an enlargement of a portion of the front view of FIG. 12.
Figure 14:
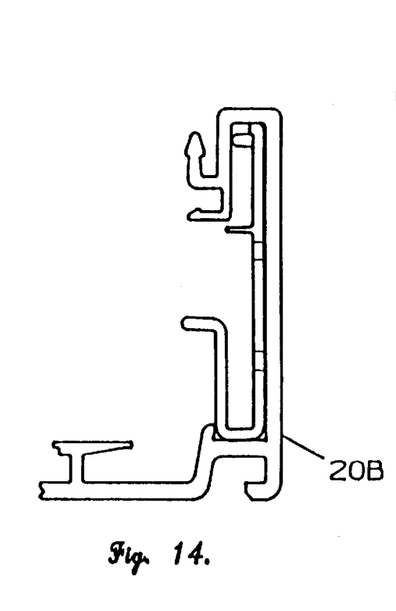
FIG. 14 is a front view, partially broken away, of a larger size of channel base of FIGS. 1 and 10 with the middle support leg of the connector clip securing the clip within the lateral clip positioning channel
Figure 15:
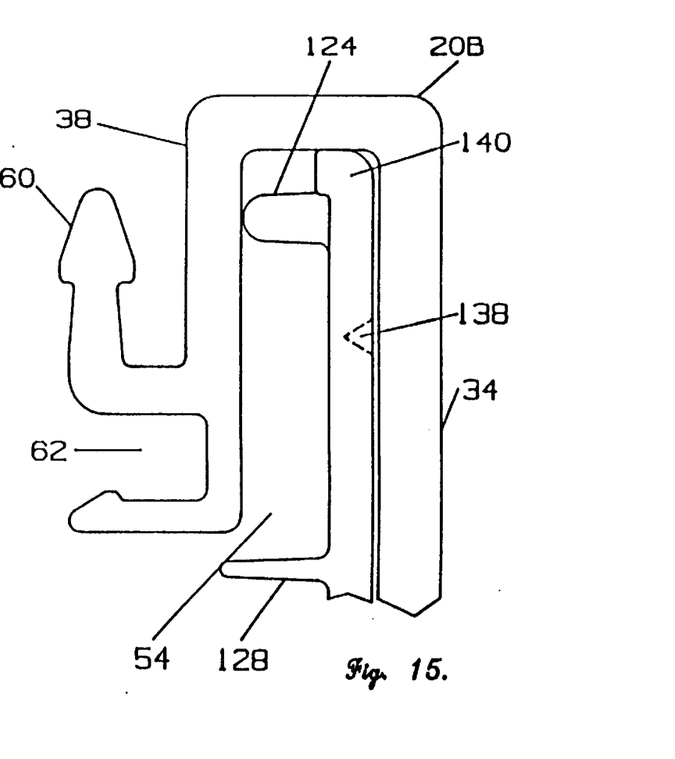
FIG. 15 is an enlargement of a portion of the front view of FIG. 14.

As best seen in FIG. 11, frangible support leg 124 is attached to main body member 122 along a score line 138 between upwardly extending portions 140 of body member 122 allowing support leg 124 to easily be removed by flexing support leg 124 along score line 138. As respectively seen in FIGS. 12 and 14, connector clip 30 can be used with different size channel bases 20A and 20B by selective removal (FIG. 12) or retention (FIG. 14) of support leg 124 which respectively have different width upper clip positioning channels 54.

While the particular preferred embodiment of the present invention has been shown and described, it will be obvious to those skilled in the art that changes and modifications may be made without departing from the teachings of the invention.

I claim:

1. A base channel connector clip for securing together longitudinally abutting sections of a base channel when the clip is disposed in an interior clip positioning channel formed in each of the longitudinally abutting base channel, comprising:

a planar Z-shaped resilient body portion adapted to resiliently engage the interior clip positioning channels of longitudinally abutting sections of the base channel, having a frangible support leg extending transversely from the body portion which can be easily removed to allow use of the connector clip with a plurality of duct sizes having different width interior clip positioning channels.

* * * * *